United States Patent
Kyker

(10) Patent No.: US 10,442,916 B2
(45) Date of Patent: Oct. 15, 2019

(54) STATOR COMPOUND HAVING AN NBIR TERPOLYMER ELASTOMERIC BASE AND STATORS AND DOWNHOLE MOTORS USING THE SAME

(71) Applicant: PV Fluid Products, Inc., Houston, TX (US)

(72) Inventor: Gary Stephen Kyker, Flint, TX (US)

(73) Assignee: PV Fluid Products, Inc., Houston, TX (US)

( * ) Notice: Subject to any disclaimer, the term of this patent is extended or adjusted under 35 U.S.C. 154(b) by 0 days.

(21) Appl. No.: 15/985,117

(22) Filed: May 21, 2018

(65) Prior Publication Data

US 2019/0023878 A1    Jan. 24, 2019

Related U.S. Application Data

(60) Continuation of application No. 15/414,494, filed on Jan. 24, 2017, now Pat. No. 9,988,513, which is a division of application No. 14/941,240, filed on Nov. 13, 2015, now Pat. No. 9,796,834.

(60) Provisional application No. 62/175,854, filed on Jun. 15, 2015.

(51) Int. Cl.
| | |
|---|---|
| C08L 9/02 | (2006.01) |
| C08K 3/04 | (2006.01) |
| F01C 1/107 | (2006.01) |
| F01C 21/08 | (2006.01) |
| F01C 21/10 | (2006.01) |
| C08J 3/22 | (2006.01) |
| E21B 4/02 | (2006.01) |

(52) U.S. Cl.
CPC . *C08L 9/02* (2013.01); *C08J 3/22* (2013.01); *C08K 3/04* (2013.01); *F01C 1/107* (2013.01); *F01C 21/08* (2013.01); *F01C 21/104* (2013.01); *C08J 2309/02* (2013.01); *C08J 2400/00* (2013.01); *C08J 2461/06* (2013.01); *C08K 2201/006* (2013.01); *C08L 2201/08* (2013.01); *C08L 2205/03* (2013.01); *C08L 2310/00* (2013.01); *C08L 2312/00* (2013.01); *E21B 4/02* (2013.01)

(58) Field of Classification Search
CPC .................................. C08K 3/04; C08L 9/02
See application file for complete search history.

(56) References Cited

U.S. PATENT DOCUMENTS

2005/0101737 A1*   5/2005   Pazur .................... C08L 15/005
                                                                                                  525/192

\* cited by examiner

*Primary Examiner* — Peter D. Mulcahy
(74) *Attorney, Agent, or Firm* — Hubbard Johnston PLLC

(57) ABSTRACT

A stator compound including an acrylonitrile butadiene isoprene rubber (NBIR) terpolymer elastomeric base.

15 Claims, 2 Drawing Sheets

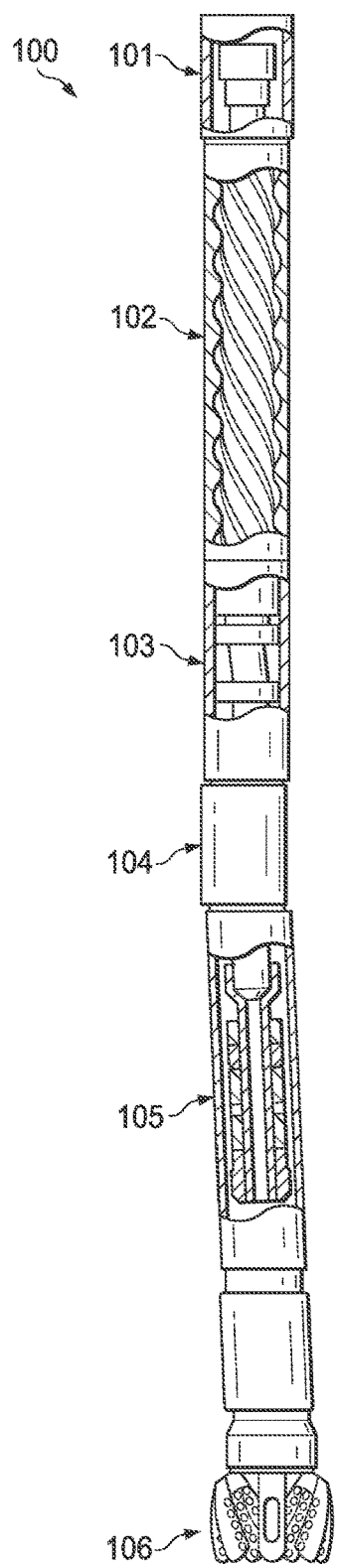
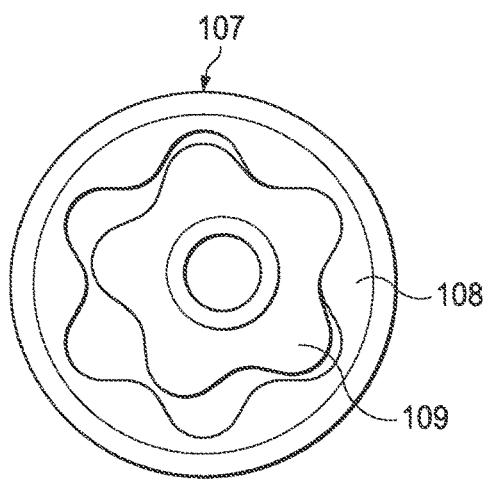
FIG. 1B
FIG. 1A

STATOR COMPOUND HAVING AN NBIR TERPOLYMER ELASTOMERIC BASE AND STATORS AND DOWNHOLE MOTORS USING THE SAME

CROSS-REFERENCE TO RELATED APPLICATION

The present application is a continuation of U.S. application Ser. No. 15/414,494 filed Jan. 24, 2017, which is a divisional of U.S. application Ser. No. 14/941,240 filed Nov. 13, 2015, which claims the benefit of U.S. Provisional Application No. 62/175,854 filed Jun. 15, 2015, all of which are incorporated herein by reference for all purposes.

FIELD OF INVENTION

The present invention relates in general to oil and gas drilling equipment, and in particular to a stator compound having NBIR terpolymer elastomeric base and stators and downhole motors using the same.

BACKGROUND OF INVENTION

In oil and gas drilling industry, the downhole motor ("mud motor") is normally disposed between the end of the drill string and the drill bit. When drilling mud is pumped down the drill string from the surface, the mud motor rotates the drill bit allowing it to cut through the surrounding material. Downhole motors are particularly useful in directional drilling, which requires steering the drill bit in a desired direction.

A typical downhole motor includes a rotating shaft ("rotor") disposed within a fixed housing ("stator"). The rotor is helically-shaped and is offset from the helically-shaped elastomeric inner lining of the stator such that when drilling mud is pumped down the drill string, the rotor rotates relative to the stator. The rotor in turn drives a transmission, which converts the eccentric motion of the rotor into circular motion to drive the drill bit.

The elastomeric inner stator liner must not only withstand the mechanical stresses placed upon it by the rotation of the rotor, but must also resist deterioration from exposure to the components of the drilling mud. However, even though mud motors have been used in the oil and gas drilling industry for many years, the ability to formulate a high-performance stator compound for fabricating the stator lining has proven to be a significant challenge, particularly for stator linings used in high-stress environments, such as those encountered in shale oil drilling operations, Previous attempts have been made to use NBR copolymers in stator compounds; however, the resulting stator liners provided poor dynamic performance, were subject to high swell in diesel-based drilling muds, and had lower tear and flex fatigue resistance at elevated temperatures (e.g., 200-350° F.).

SUMMARY OF INVENTION

The principles of the present invention are embodied in a stator compound and including an NBIR (acrylonitrile butadiene isoprene rubber), XNBIR (Carboxylated NBIR) or a HNBIR (Hydrogenated NBIR) terpolymer elastomer base. The isoprene content is nominally in the range of 5-50%, and preferably in the range of 10-30%. The elastomer may also include a bound antioxidant. In one preferred embodiment, the Mooney viscosity range is 30 to 85, the acrylonitrile content range is 28-50%, and, for embodiments using HNBIR, the residual unsaturation is in the range 0.5-20.0%.

The principles of the present invention are also embodied in a process for making a high-performance stator compound with an NBIR terpolymer elastomeric base. The process includes at least two mixing steps, the first for dispersing high reinforcing carbon black and other additives into the NBIR terpolymer elastomer to optimize flow and high temperature mechanical properties, and the second for adding curing agents. Preferably, in the first mixing step, carbon black is added to the NBIR elastomer and then mixed at less than about 300° F. for 1-5 minutes to achieve optimum dispersion. All of the other ingredients, except for the curing agents, are then added and the batch is dumped and cooled to ambient temperature. In the second step, the curing agents are mixed into the batch at a temperature of less than about 225° F.

In the preferred embodiment, a high reinforcing carbon black is used in the elastomer with the following properties: (1) Surface area of 80-250 (Iodine # mg/g); and (2); Structure of 70-178 (DOP Absorption—cc/100 g). In preferred embodiment, semi-reinforcing carbon black is also included in the elastomer, having: (1) Surface Area of 20-50 (Iodine # mg/g); and (2) Structure of 60-125 (DOP Absorption—cc/100 g). The use of sulfur-accelerator, peroxide and phenolic cure systems are preferably used in making the NBIR stator compound.

Stator compounds according to these principles are particularly suitable for fabricating elastomeric stator liners for use in both downhole motors and downhole pumps, although not limited thereto. In particular, the use of a NBIR terpolymer in a stator compound has been shown to produce improved swell properties in diesel-based drilling muds and enhanced dynamic mechanical properties such as modulus, tensile strength, flex-fatigue life and tear resistance at high temperatures (200-350° F.). Stators molded from the inventive stator compound have shown superior performance in downhole drilling motors, including longer run times under heavy loads with no "chunking" of the stator lining.

BRIEF DESCRIPTION OF DRAWINGS

For a more complete understanding of the present invention, and the advantages thereof, reference is now made to the following descriptions taken in conjunction with the accompanying drawings, in which:

FIG. 1A is a perspective view of a downhole motor assembly suitable for describing a typical application of the principles of the present invention;

FIG. 1B is a top cross-sectional view of the rotor and stator assembly of FIG. 1A.

DETAILED DESCRIPTION OF THE INVENTION

Figure 2:
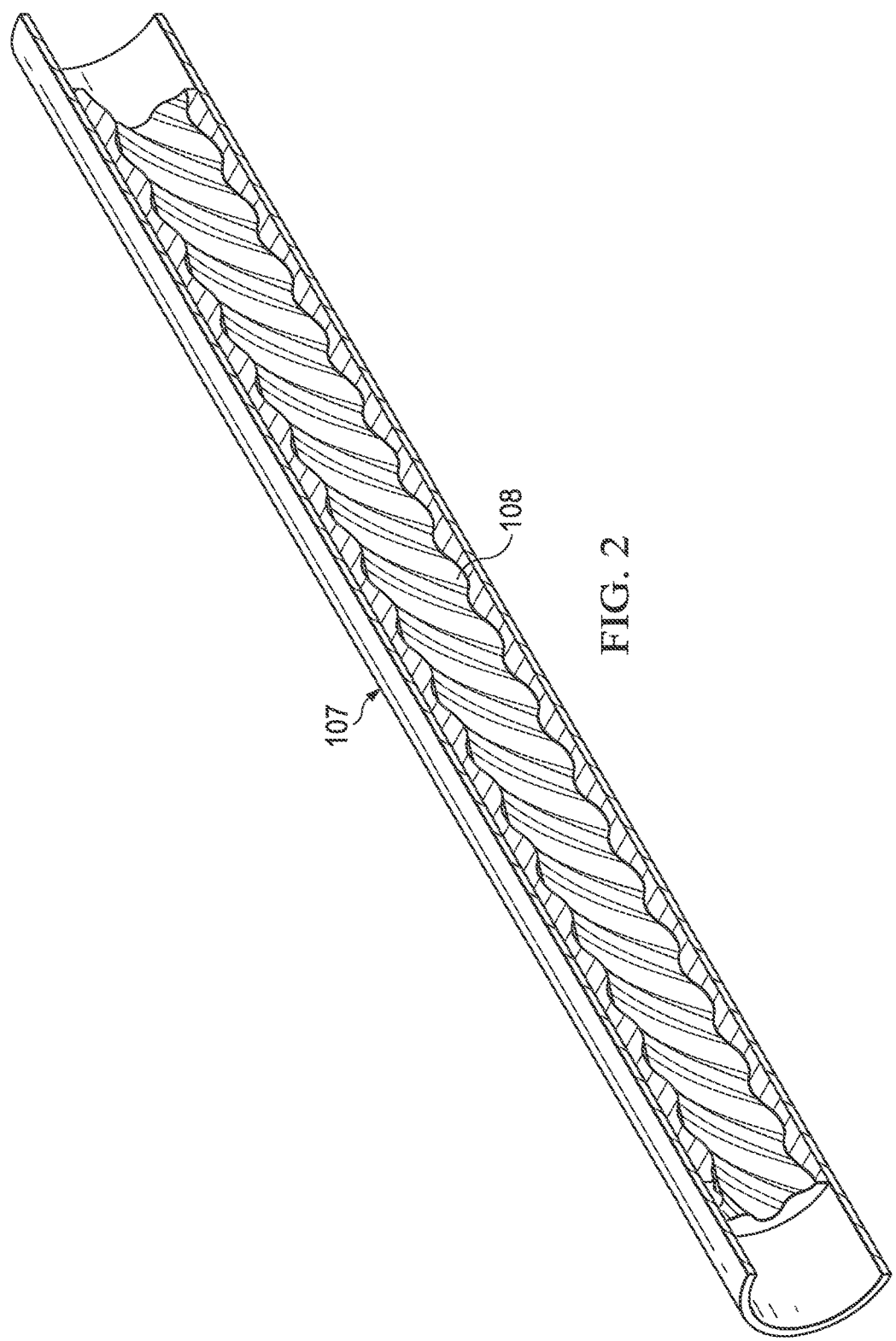
FIG. 2 is cutaway view showing a portion of the stator of FIGS. 1A and 1B including a molded stator elastomeric liner fabricated using an NBIR terpolymer according to the principles of the present invention.

The principles of the present invention and their advantages are best understood by referring to the illustrated embodiment depicted in FIGS. 1-2 of the drawings, in which like numbers designate like parts.

FIG. 1A is a diagram of an exemplary downhole motor assembly 100, which attaches to the end of a drilling string during oil and gas drilling operations. Exemplary downhole motor assembly 100 includes a top sub 101, stator and rotor assembly 102, transmission 103, offset or adjustable housing 104, bearing assembly 105, and drill bit 106. FIG. 1B is an end cut-away view of stator and rotor assembly 102 and shows the helical rotor 109 offset within the helical liner 108 of stator tube 107.

FIG. 2 is a side cutaway view of stator and rotor assembly 102 of FIG. 1, which shows stator tube 107 and associated molded stator elastomer lining 106 in further detail. The fabrication of molded stator elastomer lining 108 is one exemplary use of a NBIR terpolymer embodying the principles of the present invention.

Moreover, stator compounds of according to the principles of the present invention are also suitable for the fabrication of NBIR terpolymer stator liners used in downhole pumps. (Generally, downhole motors and pumps are structurally similar, and both implement power conversion, with downhole motors typically used to provide torque and rotation to the drill bit and downhole pumps typically used to provide pressure and flow rate for moving fluids. The typical downhole pump stator will have as few as two lobes and the typical downhole motor stator will have between three and ten lobes.)

Several elastomers types and cure systems were investigated by the inventors. The focus was to fabricate a stator lining with good dynamic mechanical properties, low swell in diesel-based muds and good hot mechanical properties at 200-350° F. It was found that the use of NBIR terpolymer in stator compounds improved dynamic mechanical properties such as sealing, hysteresis (Tan Delta) modulus, tensile strength, tear and flex-fatigue resistance. An isoprene unit was selected to be the same as in natural rubber, which is known to have these good dynamic properties. The isoprene content is nominally in the range of 5-50%, and preferably in the range of 10-30%. The acrylonitrile group (ACN) provides the resistance to drilling fluids such as oil and diesel-based muds.

According to one preferred process, the selected NBIR Terpolymer is mixed in a production rubber mixer using a two step mixing procedure to ensure dispersion of high reinforcing carbon black and other additives. In addition, this procedure also produces optimum flow (viscosity) properties and mechanical strength. A sulfur, sulfur phenolic or peroxide/co-agent cure system is preferably used to cure the compound. This cure system was developed to produce optimum scorch and curing properties. A blend of plasticizers is used to achieve good flow and diesel extraction properties.

Table 1 illustrates the preferred ingredients for the first step in producing NBIR stator compounds according to the principles of the present invention. Ranges for the preferred ingredients are listed in parts per one hundred parts of rubber (PHR). In particular, the high reinforcing carbon black has a surface area of 80-250 (Iodine # mg/g) and structure of 70-178 (DOP Absorption—cc/100 g) and the semi-reinforcing carbon black has a surface area of 20-50 (Iodine # mg/g) and structure of 60-125 (DOP Absorption—cc/100 g).

During the first step, the ingredients in Table 1 are mixed in a commercial rubber mixer for approximately 4-10 minutes and a temperature below 300° F. The mixture (i.e., the first pass masterbatch) is then allowed to cool to ambient temperature prior to the second mixing step.

TABLE 1

| INGREDIENTS ($1^{ST}$ MIX CYCLE) | PHR |
|---|---|
| NBIR TERPOLYMER | 100.0 |
| ANTIOXIDANT | 0.2-2.0 |

TABLE 1-continued

| INGREDIENTS ($1^{ST}$ MIX CYCLE) | PHR |
|---|---|
| ANTIOZONANT | 0.5-3.0 |
| SEMI-REINFORCING CARBON BLACK | 40-120 |
| HIGH REINFORCING CARBON BLACK | 5.0-40 |
| POLYMERIC PLASTICIZER | 5.0-40.0 |
| ESTER PLASTICIZER | 5.0-20.0 |
| PHENOLIC RESIN | 10.0-50.0 |
| ZINC OXIDE | 3.0-5.0 |
| STEARIC ACID | 1.0-5.0 |
| HEXAMETHYLENE TETRAAMINE | 1.0-8.0 |
| RETARDERS | 0.2-4.0 |

The preferred ingredients for the second mixing step are shown in Table 2. During the second mixing step, the ingredients of Table 2 are mixed for approximately 2-5 minutes at less than 225° F., after which mixture is dumped from the mixer and onto a two-roll mill.

TABLE 2

| INGREDIENTS ($2^{ND}$ MIX CYCLE) $1^{ST}$ PASS MASTERBATCH | PHR |
|---|---|
| SULFUR | 0.50-5.0 |
| RUBBER ACCELERATORS | 0.5-5.0 |

The resulting NBIR terpolymer compound has been shown to have good resistance in water and diesel-based drilling fluids. This compound also shows good dynamic mechanical properties, flex fatigue life and tear resistance at high temperatures (200-350° F.). The high value at low strain modulus (i.e., less than 25%) reduces flexing of the stator lobe, which results in improved performance.

The characteristics of the preferred embodiment of the present NBIR terpolymer stator compound are provided in Table 3:

TABLE 3

RHEOLOGICAL, CURE AND MECHANICAL PROPERTIES FOR NBIR STATOR COMPOUND

| VISCOSITY (ASTM D1646) | MOONEY VISC. (ML1 + 4) @ 100° C. MU | 20-100 |
|---|---|---|
| | MOONEY SCORCH T5@100° C. minutes | >60 |
| RHEOLOGY (ASTM 2084) | MDR (Rheometer) | 60' @ 160° C. |
| | ML (dNm)[1] | 0.5-3.0 |
| | MH (dNm) | 20-80 |
| | TS (2) minutes | 1.5-5.0 |
| | TC (90) minutes | 5.0-25.0 |
| | Tan Delta | 0.10-0.30 |
| MICRODUMBELL (ASTM D1708) Tested @ 121° C. | HOT PROPERTIES | |
| | TENSILE STRENGTH (psi)[2] | 800-2000 |
| | ELONGATION % | 125-300 |
| | 25% MODULUS (psi) | 250-600 |
| TEAR (ASTM D624) | DIE C @ 121° C. (ppi) | 50-200 |
| | TROUSER @ 121° C. (ppi)[3] | 5-100 |
| DIN ABRASION (ASTM D5963) cured 30'@177° C. (mm³) | | 100-250 |
| DeMattia Flex (ASTM D813) Initial piercing is 2 mm wide per ASTM D813. Width of specimen is 25.4 mm. | Final Crack Width (mm) | 18.5 |
| | Cycles to Final Width | 5,000-20,000 |
| Capillary Rheometer | Load: 35 kg Shear Rate (s⁻¹) Kg—kilograms | 5-20 |

TABLE 3-continued

RHEOLOGICAL, CURE AND MECHANICAL PROPERTIES
FOR NBIR STATOR COMPOUND

| | | |
|---|---|---|
| (ASTM D5099) Die: 1.0 mm × 2.0 mm/Temp: 100° C. | Viscosity (Pa · s)[4] | 100-400 |
| DIESEL-BASED MUD RESISTANCE | | 72 H @ 250° F. |
| % VOLUME CHANGE - | | +5.0/−2.0 |
| SHORE A HARDNESS CHANGE | | +5/−5 |
| 25% MODULUS (% CHANGE) | | +25/−10 |
| TENSILE STRENGTH (% CHANGE) | | +25/−10 |
| ELONGATION (% CHANGE) | | +10/−25 |

[1]dNm = decinewtons meter
[2]Psi = pounds per square inch
[3]Ppi = pounds per inch
[4]Pa · s = Pascal · second Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of making a stator compound, comprising:
   during a first mixing stage, mixing a high reinforcing carbon black with an elastomeric base at a temperature below about 300 degrees Fahrenheit without curing agents to produce a mixture, wherein the elastomeric base has one or more rubber components, wherein the only rubber components of the elastomeric base are acrylonitrile butadiene isoprene rubbers (NBIR); and
   during a second mixing stage, mixing curing agents into the mixture.

2. The method of claim 1, wherein mixing a high reinforcing carbon black with the elastomeric base comprises mixing a high reinforcing carbon black having a surface area of about 80 to about 250 (Iodine # mg/g) and a structure of about 70 to about 178 (DOP Absorption—cc/100 g) with the elastomeric base.

3. The method of claim 1, further comprising mixing a semi-reinforcing carbon black with the elastomeric base during the first mixing stage.

4. The method of claim 3, wherein mixing a semi-reinforcing carbon black with the elastomeric base comprises mixing a semi-reinforcing carbon black having a surface area of about 20 to about 50 (Iodine # mg/g) and a structure of about 60 to about 125 (DOP Absorption—cc/100 g) with the elastomeric base.

5. The method of claim 1, further comprising mixing at least one plasticizer selected from the group consisting of polymeric and ester plasticizers with the elastomeric base during the first mixing stage.

6. The method of claim 1, wherein mixing curing agents into the mixture comprises mixing sulfur into the mixture during the second mixing stage.

7. The method of claim 1, further comprising mixing an antioxidant with the elastomeric base during the first mixing stage.

8. The method of claim 1, further comprising mixing at least one of a phenolic resin without a curing agent, zinc oxide, stearic acid, and hexamethylene tetraamine with the elastomeric base during the first mixing stage.

9. A stator for use in a downhole motor or pump and having a stator liner, the stator liner formed of a stator compound having an elastomeric base, the elastomeric base having one or more rubber components, wherein the only rubber components of the elastomeric base are acrylonitrile butadiene isoprene rubbers (NBIR).

10. The stator of claim 9, wherein the rubber components are selected from the group consisting of hydrogenated acrylonitrile butadiene isoprene rubber (HNBIR), acrylonitrile butadiene isoprene rubber that has not been hydrogenated, and carboxylated acrylonitrile butadiene isoprene rubber (XNBIR).

11. The stator of claim 9, wherein the stator liner is formed of a stator compound further including a least one of a high reinforcing carbon black and a semi-reinforcing carbon black.

12. The stator of claim 9, wherein the stator liner is formed of a stator compound further including a high reinforcing carbon black having a surface area of about 80 to about 250 (Iodine # mg/g) and a structure of about 70 to about 178 (DOP Absorption—cc/100 g).

13. The stator of claim 9, wherein the stator liner is formed of a stator compound further including a semi-reinforcing carbon black has a surface area of about 20 to about 50 (Iodine # mg/g) and a structure of about 60 to about 125 (DOP Absorption—cc/100 g).

14. The stator of claim 9, wherein the stator liner is formed of a stator compound further including at least one plasticizer selected from the group consisting of polymeric and ester plasticizers.

15. The stator of claim 9, wherein the stator liner is formed of a stator compound further including an antioxidant.

* * * * *